United States Patent [19]

Sogabe

[11] Patent Number: 4,577,832

[45] Date of Patent: Mar. 25, 1986

[54] ROTARY DRIVING APPARATUS

[75] Inventor: Ichita Sogabe, Gifu, Japan

[73] Assignees: Nippondenso Co., Ltd., Kariya; Toyota Jidosha Kabushiki Kaisha, Toyota, both of Japan

[21] Appl. No.: 704,031

[22] Filed: Feb. 21, 1985

[30] Foreign Application Priority Data

Feb. 24, 1984 [JP] Japan .............................. 59-34879

[51] Int. Cl.[4] .............................. F16K 31/02

[52] U.S. Cl. .............................. 251/129.11; 239/229; 251/129.12; 251/129.09

[58] Field of Search .............. 251/129, 133, 134, 137, 251/65; 335/229, 230, 234; 137/625.65

[56] References Cited

U.S. PATENT DOCUMENTS

| | | | |
|---|---|---|---|
| 2,718,614 | 9/1955 | Gamble | 335/229 |
| 3,120,943 | 2/1964 | Donelan | 251/139 |
| 3,175,585 | 3/1965 | Faisandier | 137/625.65 |

FOREIGN PATENT DOCUMENTS

| | | | |
|---|---|---|---|
| 161382 | 10/1982 | Japan | 251/133 |
| 148408 | 9/1983 | Japan . | |

*Primary Examiner*—Samuel Scott
*Assistant Examiner*—Noah Kamen
*Attorney, Agent, or Firm*—Cushman, Darby & Cushman

[57] ABSTRACT

A rotary driving apparatus having a tubular casing in which a stator having a pair of circumferentially spaced pole portions and a rotor having a pair of radially spaced pole portions are arranged. One of the rotor and the stator is made of a permanent magnet. The apparatus has a coil for magnetizing the other one of the rotor and the stator. The rotor extends out of the inner periphery of the stator so that rotation of a limited angle of the rotor is allowed, the direction of which is changed in accordance with the direction of the electric current applied to the coil.

11 Claims, 15 Drawing Figures

| Fig. 6A |
| --- |
| Fig. 6B |

ROTARY DRIVING APPARATUS

BACKGROUND OF THE INVENTION

1. Field of the Invention

The present invention relates to a rotary drive apparatus of a type wherein a magnetic force is generated between a rotor and stator for reciprocatively moving the rotor. The apparatus is adapted for use as a compact rotary type actuator utilized for operating, for example, a rotary valve.

2. Description of the Related Art

Known in the prior art is a rotary apparatus including a rotor made of a magnetic material of an elongated shape with oppositely magnetized ends yokes of C-shape arranged astride the rotor, permanent magnets connected to the yokes, and a coil for magnetizing the rotor so that the ends of the rotor are oppositely magnetized (see Japanese Unexamined Patent Publication No. 58-148408). This rotary apparatus is adapted for use for driving a self-holding type relay apparatus. Each of the yokes has a pair of ends which face the ends of the rotor and which are magnetized by means of the corresponding permanent magnet. The ends of one yoke faces with the ends of the other yoke via the respective ends of the rotor. Due to this construction, flows of magnetic flux are generated between the rotor, yoke, and the permanent magnets, causing the rotor to be rotated for a limited angle between the two positions defined by the distance between the ends of the yokes.

The above-mentioned prior art suffers from the drawback that the yokes are required to transmit the magnetic flux for generating a closed loop of the flow of the magnetic flux causing an increase in the number of parts for constructing the apparatus and resulting in a complicated structure thereof.

SUMMARY OF THE INVENTION

An object of the present invention is to provide a rotary driving apparatus of simplified construction.

Another object of the present invention is to provide a rotary driving apparatus capable of eliminating the yoke.

Further another object of the present invention is to provide a rotary driving apparatus capable of attaining a large stationary torque during a non-energization condition of the apparatus.

According to the present invention, there is provided a rotary drive apparatus including an axially elongated casing; a rotor rotatably arranged in the casing about an axis of the casing; and a first stator fixedly arranged in the casing, the stator having a pair of circumferentially spaced pole portions, each of which defines a pair of spaced side surfaces extending substantially radially and an inner circumferential surface connecting the side surfaces. The rotor has a pair of radially spaced pole portions, each of which defines a pair of spaced side surfaces extending substantially radially outward of the inner surfaces of the pole portions of the stator, allowing rotation of the rotor of a limited angle between a position where at least one pair of opposing side surfaces of the stator pole portions and the rotor pole portions are engaged with each other and another position where at least another one pair of the opposing surfaces of the stator pole portions and the rotor pole portions are engaged with each other. One of the rotor or the stator is made as a permanent magnet, the corresponding pole portions of the one member being oppositely magnetized. The other one of the rotor and the stator is made of a magnetic material. The apparatus further includes coil means for magnetizing the other member so that the corresponding pole portions are oppositely magnetized, whereby a closed loop of magnetic flux, the direction of which is determined in accordance with the directin of an electric current in the coil means; is generated in order to attain the rotational movement of the rotor of desired direction between the positions.

BRIEF EXPLANATION OF THE DRAWINGS

FIG. 3' shows a connection of the coils to respective terminals in FIG. 1;

FIG. 8' shows a connection of the coil ends to terminals in the embodiment of FIG. 8;

DESCRIPTION OF THE PREFERRED EMBODIMENTS

Embodiments of the present invention will now be described with reference to the attached drawings.

Figure 1:
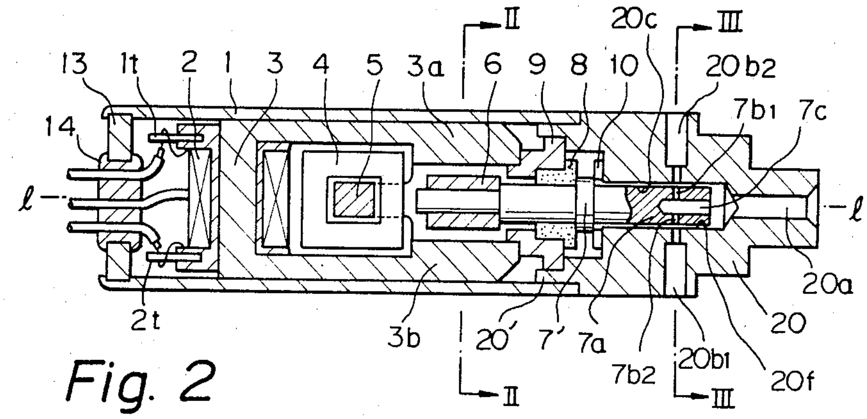
FIG. 1 is a longitudinal cross-sectional view of a rotary drive apparatus according to the present invention applied for operating a flow switching valve.

A first embodiment of the rotary driving apparatus of the present invention is shown in FIG. 1, wherein the invention is applied for a torque motor for switching a valve in three stages. In FIG. 1, reference numeral 1 denotes a casing of a tubular shape for accommodating parts of the torque motor. A housing 20 of a sleeve shape has, at its one end, a reduced diameter portion 20'. The casing 1 is inserted to the reduced diameter portion 20'. As will be described later, a valve mechanism is provided in the housing 20.

Figure 7:
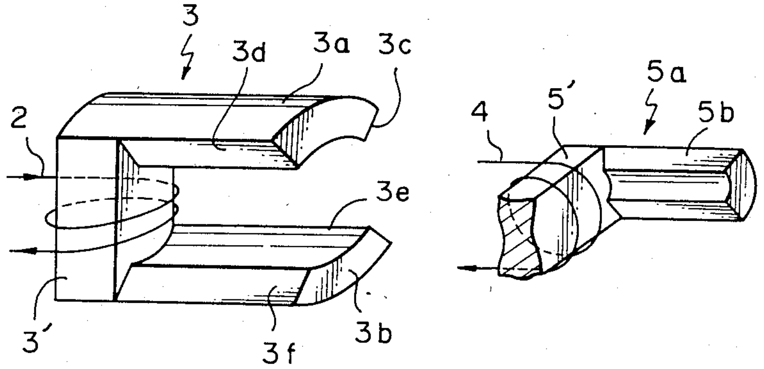
FIG. 7 is a schematic view of the stator members in FIG. 1 partly broken and dismantled.

A first stator 3 made of magnetic material is arranged in the casing 1. As shown in FIG. 7, the first stator has a base portion 3' and a pair of diametrically opposite pole portions 3*a* and 3*b* of an arc-shaped cross-section, which portions 3*a* and 3*b* extend in the axial direction in a cantilever fashion from the base portion 3'. A coil 2 is arranged on the stator 3 in such a manner that the pole portions 3*a* and 3*b* are oppositely magnetized.

Figure 2:
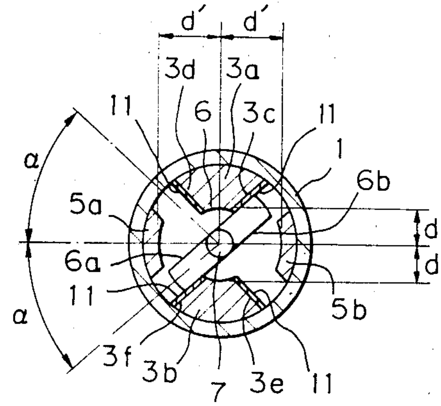
FIG. 2 is a cross-sectional view taken along line II—II in FIG. 1.

A second stator 5 made of magnetic material is arranged inside the casing 1. The second stator 5 has a base portion 5' and a pair of pole portions 5a and 5b of an arc-shaped cross-section, extending in the axial direction in a cantilever fashion from the base portion 5'. A coil 4 is arranged on the second stator 5 in such a manner that the portions 5a and 5b are oppositely magnetized. As shown in FIG. 2, the portion 5a or 5b of the second stator 5 is arranged between the portions 3a and 3b of the first stator 3 in the circumferential direction.

The pole portions 3a and 3b of the first stator 3 have pairs of circumferentially spaced side surfaces 3c, 3d and 3e, 3f, (FIGS. 2 and 7) extending radially, which operate as stopping means for limiting the rotation of a rotor 6, as will be described in detail later.

Figure 4:
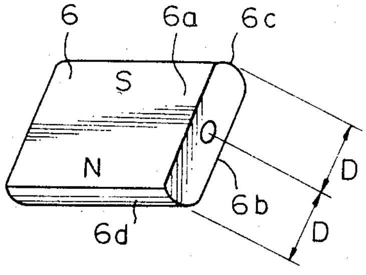
FIG. 4 is a perspective view of a rotor in FIG. 1.

A permanent magnet rotor 6 is arranged so as to rotate about a longitudinal axis l—l (FIG. 1). As shown in FIG. 4, the rotor 6 is generally formed as a plate having a pair of spaced surfaces 6a and 6b extending parallelly along the longitudinal axis and having a pair of diametrically spaced outer peripheral surfaces 6c and 6d. As a result of this construction, the rotor 6 forms, in the cross-section opposite to the axis, an elongated rectangular shape as shown in FIG. 2. The rotor 6 is made of a permanent magnet material and is so magnetized that diametrically opposite portions astride the rotational axis l—l have opposite poles N and S.

The permanent magnet rotor 6 extends radially so that a distance D between the axis l—l and the outer peripheral surfaces 6c and 6d of the rotor 6 is larger than a distance d (FIG. 2) between the axis l—l and the inner surface of the portions 3a and 3b of the stator 3, so that the rotation of the rotor 6 of a limited angle 2α is allowed between a position where the side surfaces 6a and 6b contact the side surfaces 3c and 3f and a position where the side surfaces 6a and 6b contact the side surfaces 3d and 3e.

It should be noted that the distance D is, of course, shorter than distance d' between the axis l—l and the inner surface of the portions 5a and 5b of the second stator 5, thus preventing the angular rotation of the rotor 6 from being blocked.

Advantageously layers 11 made of non-magnetic material such as rubber may be attached on the side surfaces of the first stator 3, so as to generate appropriate gaps between the surfaces 3c, 3d, 3e, and 3f of the first stator 3 and the parallel surfaces 6a and 6b of the permanent rotor 6, permitting a desired torque to be applied to the rotor 6 to maintain it immobilized.

Figure 3:
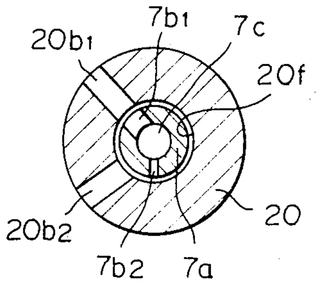
FIG. 3 is a cross-sectional view taken along line III—III in FIG. 1.
Figure 3:
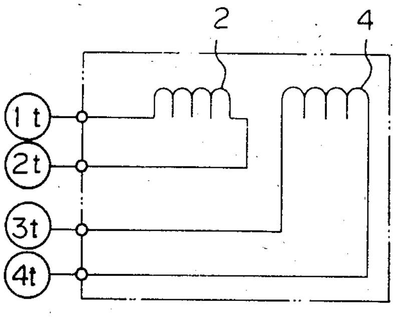

An output shaft 7 is rotatably supported to the housing 20 by means of a bearing member 8 of a sleeve shape. Adjacent to the bearing member 8, the output shaft 7 defines a collar portion 7' with which a thrust washer 10 abuts. The bearing member 8 is inserted to a sleeve member 9 made from non-magnetic material which is connected to the housing 20. As shown in FIG. 3, the output shaft 7 defines at its end remote from the rotor 6 a valve member 7a which is arranged in an axial bore 20f in the housing 20. The valve member 7a has an axial opening 7c opened to the bore 20f, and a first and a second switching port $7b_1$ and $7b_2$, which ports $7b_1$ and $7b_2$ extend in the radial direction so that they are opened to the axial opening 7c at their inner ends. The outer ends of the ports $7b_1$ and $7b_2$ are opened to the outer cylindrical surface of the valve member 7a.

Figure 5:
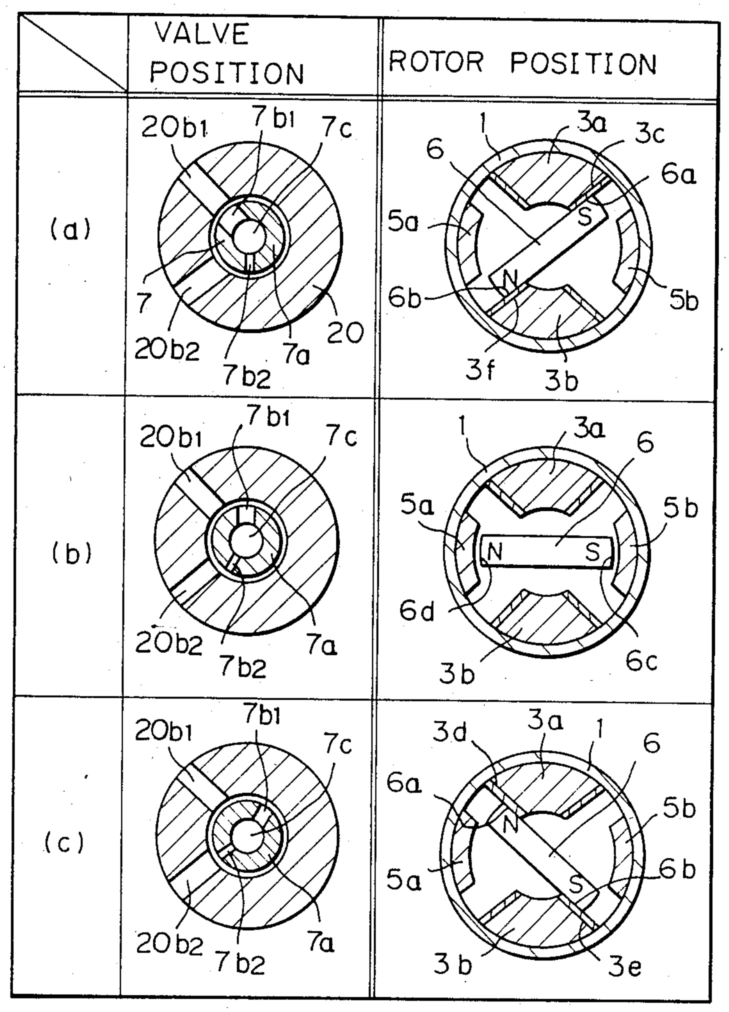
FIG. 5 shows three positions of the rotor and the valve member connected thereto in the first embodiment.

The housing 20 has an inlet port 20a for a fluid which is opened to the bore 20f and has circumferentially spaced first and second outlet ports $20b_1$ and $20b_2$ which extend radially so that they are opened to the axial opening 7c at their inner ends. As a result of this construction, the valve member 7a can control the flow in accordance with the angular position of the valve member 7a. In a position (a), as shown in FIG. 5, the first switching port $7b_1$ of the valve member 7a communicates with the first outlet port $20b_1$ of the housing 20 while the second switching port $7b_2$ is disconnected from the second outlet port $20b_2$. In a position (b), the valve member 7a is situated so that the first and the second switching ports $7b_1$ and $7b_2$ are disconnected from the first and the second outlet ports $20b_1$ and $20b_2$, respectively. Furthermore, in a position (c), the valvemember 7a is located so that the second switching port $7b_2$ communicates with the second outlet port $20b_2$ while the first switching port $7b_1$ is disconnected from the first outlet port $20b_1$. Since the first and the second switching ports $7b_1$ and $7b_2$ have different diameters, the amount of fluid passed through the valve is controlled in three stages, i.e., large, zero, and small, in accordance with the positions (a), (b), and (c).

In FIG. 1, a cover 13 is connected to the casing 1 at the end remote from the valve member 7a. A grommet 14 is fitted to the cover 13 for protecting lead wires 15 passed therethrough. The lead wires 15 extend to respective terminals 1t and 2t, and 3t and 4t which are connected to respective ends of the coils 2 and 4, as shown in FIG. 3'.

Figures 6, 6A:
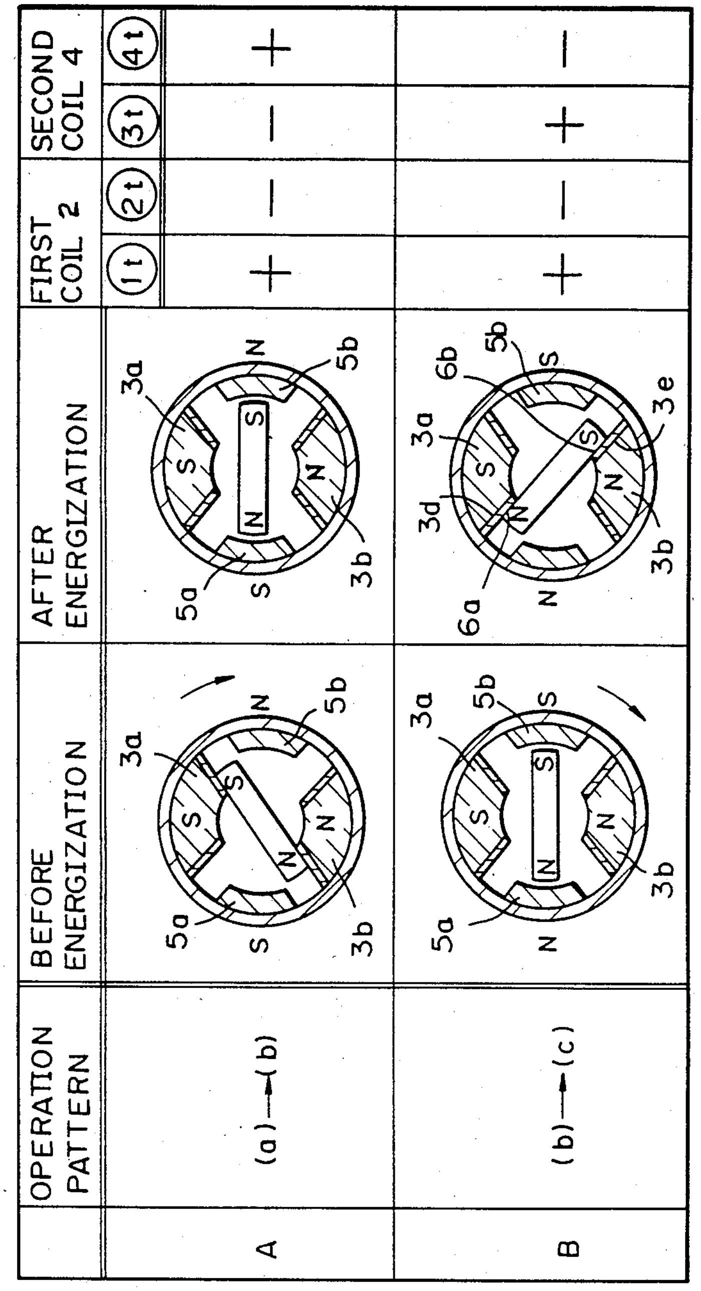
FIGS. 6A and B show operational patterns for moving a rotor between, three positions and connection of the coils to obtain the required patterns.
Figure 6B:
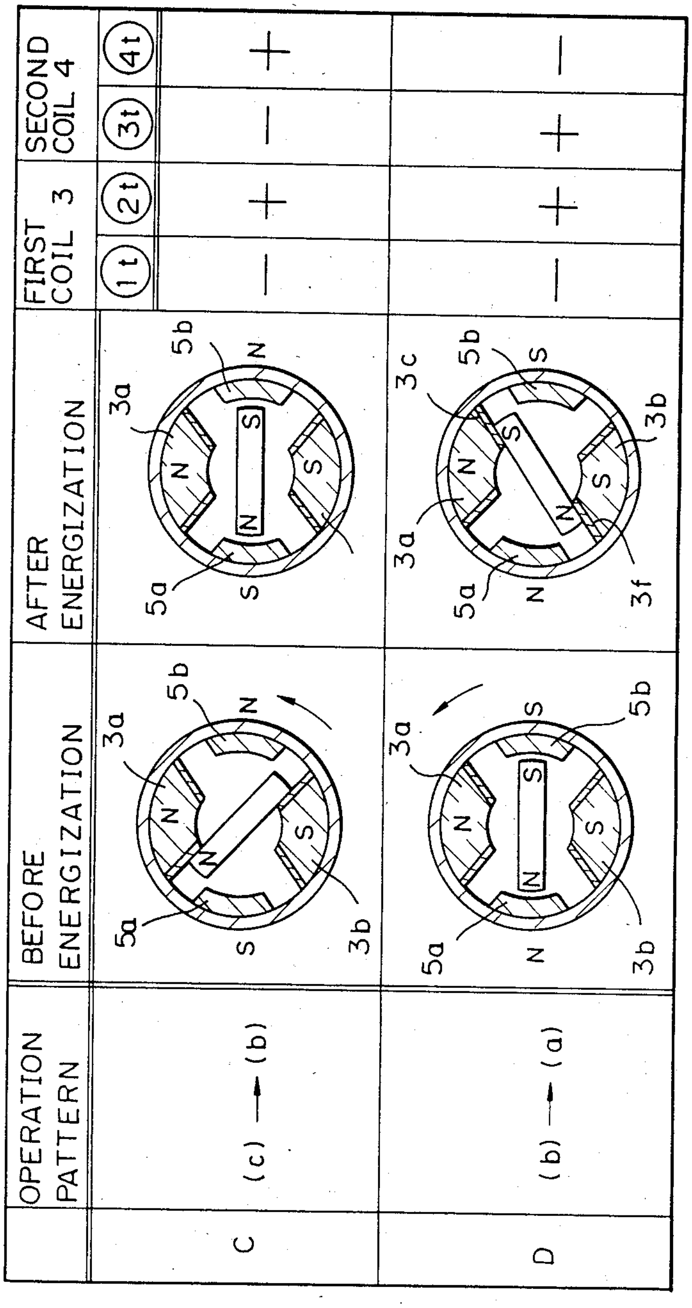

Referring to FIGS. 5 and 6, an operation of the torque motor capable of operating the multistage switching valve according to the present invention will be described. First, when the permanent magnet rotor 6 and the output shaft 7 are located as shown by (a) in FIG. 5, the permanent magnet rotor 6 provides a magnetic flux to maintain these parts immobilized along a closed loop constructed by the surface 6a of the rotor 6—the surface 3c of the portion 3a of the stator 3—the portion 3a—the base portion 3' (FIG.7) of the stator 3—the portion 3b of the stator—the surface 3f of the portion 3b—and the surface 6b of the rotor 6.

In order to move from (a) to (b) in FIG. 5, the terminals 1t and 2t of the first coil 2 (FIG. 3) and the terminals 3t and 4t of the second coil 4 are connected to the electric source as shown in FIG. 6, respectively, so that the pole portions 3a and 3b and 5a and 5b of the first and the second stators are magnetized to S and N and N and S, respectively. As a result, the rotary magnet rotor 6 turns clockwise from the first position (a) to the position (b), referred to as an intermediate position. The rotor 6 is maintained in the intermediate position even if the coils 2 and 4 are deenergized.

When the rotor 6 is in the intermediate position (b), a closed magnetic circuit is formed via the rotor 6, which results in a torque to hold the rotor 6 at the intermediate position as shown in FIG. 5. The above-mentioned closed circuit is formed along the outer surface 6d of the rotor 6—the portion 5a of the second stator 5—the base portion 5' (FIG. 7) of the second stator 5—the portion 5b of the second stator 5—and outer surface 6c of the rotor 6.

In order to move the rotor 6 and shaft 7 from the intermediate position (b) to the second position (c), the coils 2 and 4 are energized as shown by FIG. 6-B. The second coil 4 is oppositely connected to the electrical source when compared with the connection of the coil 4 to the electric source in the case of A, while the connection of the coil 2 is maintained the same. As a result, the hole portions 3a and 3b and 5a and 5b are magnetized to S and N and N and S, respectively, so that the permanent magnet rotor 6 attains a rotation of angle $\alpha$ in the clockwise direction, allowing the rotor 6 to be rotated to the second position (c) wherein the surfaces 6a and 6b of the permanent magnet rotor 6 contact the surfaces 3d and 3e of the first portions 3a and 3b of the first stator 3, respectively. When the permanent magnet rotor 6 is in the second position (c), a closed magnetic circuit is generated by way of the permanent magnet rotor 6 so as to produce a torque, allowing the permanent magnet rotor 6 to be held at this position (c). The closed circuit is, in this case, formed by a loop along the surface 6a of the rotor 6, the surface 3d of the portion 3a of the stator 3, the base portion 3' of the stator 3, the portion 3b of the stator 3, the surface 3e of the portion 3b, and the surface 6b of the rotor 6.

In order to turn the permanent magnet rotor 6 counterclockwise from the second position (c) to the intermediate position (b), as shown in FIG. 6-C, the connection of the terminals 1t and 2t and 3t and 4t of the first and the second electric coils 2 and 4 with respect to the electric source are both reversed when compared with that of the FIG. 6-B, so that the portions 3a and 3b and 5a and 5b are magnetized to N and S and S and N, respectively, causing the permanent magnet rotor 6 to be turned counterclockwise for an angle $\alpha$, which results in the permanent magnet rotor 6 being in its intermediate position (b) due to the torque obtained by the above-mentioned closed magnetic circuit.

In order to attain further rotation of an angle of $\alpha$ to move from the intermediate position (b) to the first position (a), as shown in FIG. 6-D, only the connection of the second coil 4 is reversed so that the portions 3a and 3b and 5a and 5b are magnetized to N and S and N and S, respectively. The permanent magnet rotor 6 is turned counterclockwise for an angle of $\alpha$ until the position where the surfaces 6a and 6b of the rotor 6 abut the surfaces 3c and 3f of the portion 3a and 3b of the first stator 3. The first position (a) of the rotor is maintained even if the coils 2 and 4 are deenergized due to the torque generating along the closed flux loop as already mentioned.

As will be clear from the above, the permanent magnet rotor 6 can be moved between the first, intermediate and second positions (a), (b), and (c) in accordance with the patterns of connection to the electric source and can be held at the selected positions due to the torque obtained by the magnetic force from the permanent magnet rotor 6. The valve member 7a connected to the permanent magnetic rotor 6 thus can be moved between the three positions correspondingly, in order to switch the direction of fluid passed through the valve and to control the amount of fluid passed therethrough.

It will be clear from the above that the permanent magnet rotor has in cross-section an elongated rectangular shape to define a pair of spaced parallel surfaces in the direction of the axis of the rotor so that the distance d between the axis l—l to the inner surface of the pole portions 3a and 3b of the stator 3 is smaller than the distance D from the axis l—l to the outer surfaces 6c and 6d of the permanent magnet rotor 6. Due to this construction, contact surfaces 3c, 3d, 3e, and 3f are created for stopping the rotation of the permanent magnet rotor 6. These provided positive stopping points to restrict the rotation of the rotor for an angle of $2\alpha$. At each of the stopping points, even if the coils 2 and 4 are deenergized, a closed magnetic circuit of a small magnetic resistance is generated by the magnetic flux issued from the rotor 6, which flux generates a torque in the direction of rotation of the permanent magnetic rotor sufficient to maintain the rotor to the stator. The radius R of the permanent magnet rotor 6, larger than a radius r of the inner circuit defined by the inner surfaces of the portions 3a and 3b of the first stator 3, permits the outer peripheral end of the permanent magnet rotor to be arranged adjacent to the inner periphery of the case 1. Thus, a large output torque may be obtained without increasing the outer diameter of the device.

Furthermore, according to the present invention, no yoke is used to transmit magnetic flux as in the prior art. Thus, the number of parts is reduced and construction is simplified.

According to the present invention, the apparatus generally forms a tubular shape (so-called pencil type), which allows a large torque to be obtained for holding the rotor stationary during the non-energization of the coil, irrespective of the small dimensions of the device.

Figure 8:
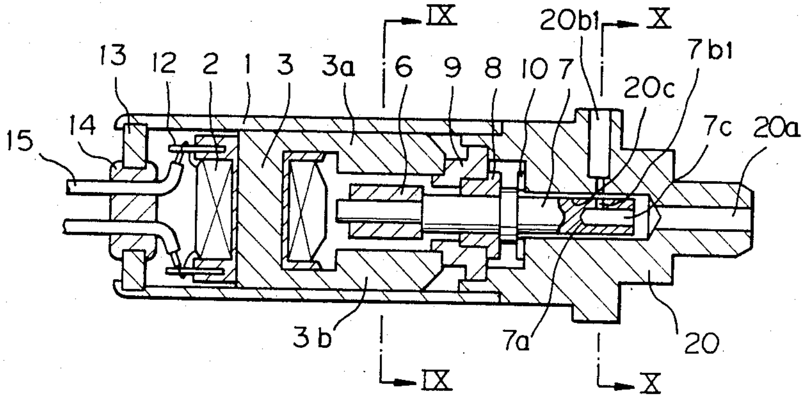
FIG. 8 is a longitudinal cross-sectional view of a rotary drive apparatus according to the second embodiment of the invention.
Figure 8:
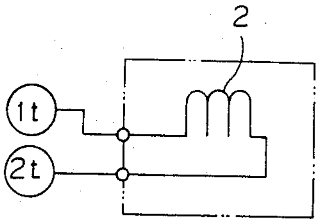

FIG. 8 shows a second embodiment adapted for use for a valve capable of two stage switching.

Figure 9:
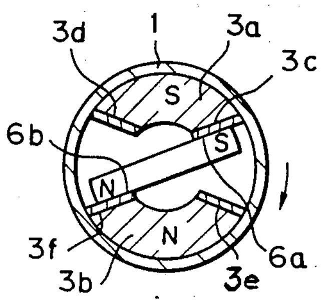
FIG. 9 is a cross-sectional view taken along IX—IX line in FIG. 8.
Figure 10:
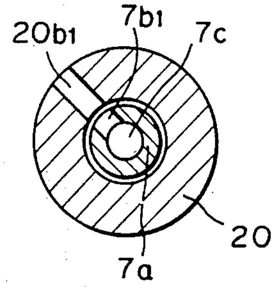
FIG. 10 is a cross-sectional view taken along X—X line in FIG. 8.

The second embodiment is substantially the same in construction as the first embodiment, except that the second driving coil 4, the second stator 5, the second switching port $7b_2$ formed in the valve portion of the output shaft 7, and the second outlet port $20b_2$ in the housing 20 in the first embodiment are eliminated, as shown in FIGS. 9 and 10.

Figure 11:
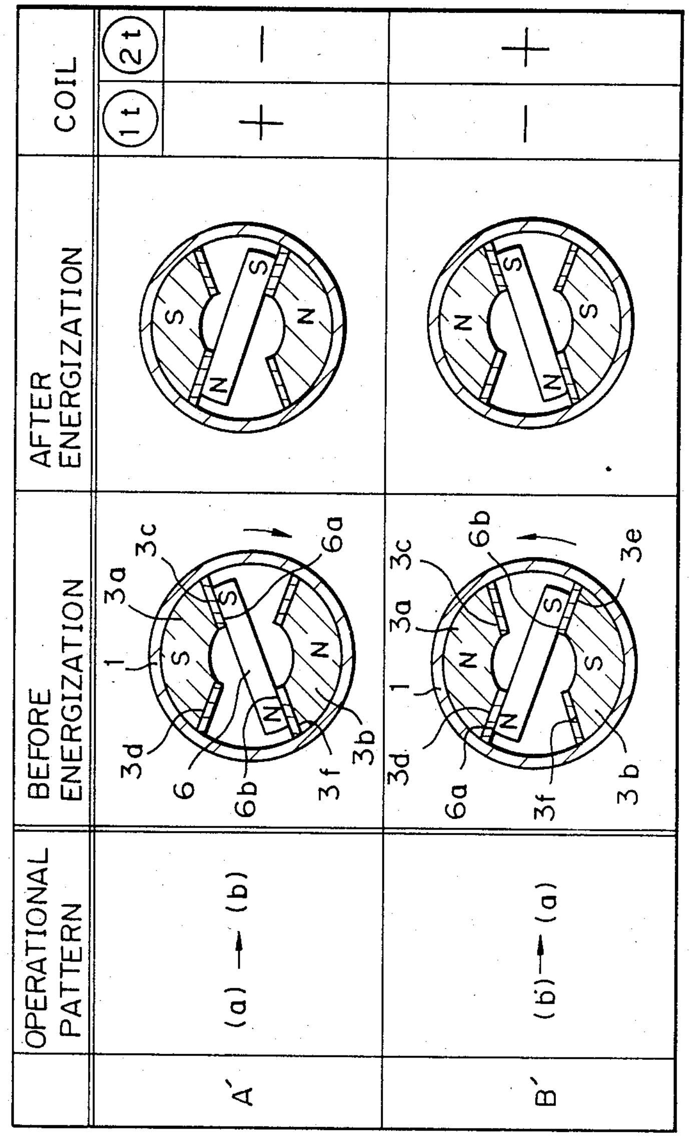
FIG. 11 shows operational patterns and connections of the coil to obtain the desired patterns in the embodiment of FIG. 8.

The operation of the second embodiment will be described with reference to FIG. 11. When the permanent magnet rotor 6 is in a position as shown in FIG. 11-A', a closed magnetic circuit is generated by way of the permanent magnet rotor 6, to generate a torque to maintain the rotor 6 in the first position (a). This closed circuit is formed along the loop of the surface 6a of the permanent magnet rotor 6—the surface 3c of the portion 3a of the stator 3—portion 3a of the stator 3—base portion 3' (FIG. 7) of the stator 3—portion 3b of the stator 3—surface 3f of the portion 3b—and surface 6b of the permanent magnet rotor 6.

In FIG. 11-A', in order to move from the first position (a) to the second position (b), the terminals of the coil 2 as shown in FIG. 11 are connected to the electric source in such a manner that the portions 3a and 3b are magnetized to S and N, respectively. As a result of this, the permanent magnet rotor 6 turns clockwise to the second position (b). Even if the coil is deenergized, the permanent magnet rotor 6 is held at the second position (b) in FIG. 11-A'.

When the permanent magnet rotor 6 is in the second position (b) in FIG. 11-A', a closed magnetic circuit is generated by way of the permanent magnet rotor 6, which produces a torque to maintain the rotor in the second position (b). The closed magnetic circuit is formed along the loop of the permanent magnet rotor 6—surface 3d of the portion 3a of the stator 3—portion 3a of the stator 3—base portion 3' of the stator 3—portion 3b of the stator 3—surface 3e of the portion 3b—and surface 6b of the rotor 6.

In order to move the permanent rotor 6 from the second position (b) to the first position (a) as shown in FIG. 11-B', the connection of the coil 2 to the electric source is reversed when compared to that of FIG. 11-A' so that the portions 3a and 3b are magnetized to N and S, respectively, which results in rotating the permanent magnet rotor 6 counterclockwise so as to stop at the position as shown in FIG. 11-B'. As similar to the above description, a torque is generated along the closed circuit by way of the permanent magnet rotor 6.

As will be clear from the above, the permanent magnet rotor 6 can be selectively moved between the first and the second positions (a) and (b) in FIG. 9. Thus, two-stage switching of the valve member 7*a* to the shaft 7 is attained.

Figure 12:
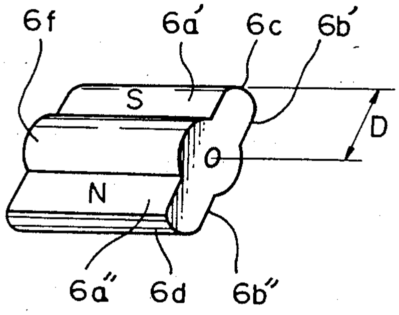
FIG. 12 is a perspective view of a modification of the rotor.

The rotary magnet rotor may have a shape other than that described in FIG. 4. For example, as shown in FIG. 12, the rotor 6 may have a cylindrical portion 6*f* and a pair of diametrically opposite projections which define parallel side surfaces 6*a* and 6*b'* and 6*a'* and 6*b''*. This rotor operates similar to the rotor in FIG. 4. Furthermore, the side surfaces 3*c*–3*f*, 6*a* and 6*b*, 6*a'* and 6*b'*, and 6*a''* and 6*b''* are advantageously formed as flat planes. However, other shapes allowing abutment and stoppage of these parts with each other may be employed.

In the described embodiments, the rotor is a permanent magnet, while the stator is made from a magnetic material and is operated by driving means such as the coil. However, these parts are interchangeable, i.e., a permanent magnet may be used as a stationary member, while the magnetizing member operated by a driving means such as a coil may be used as the rotor member.

Furthermore, it should be noted that the present invention may be generally used as an actuator in addition to its use as a valve as described in the specification.

While the invention is described with reference to the attached drawings, many modifications and changes may be made by those skilled in this art without departing from the scope of the invention.

I claim:

1. A rotary drive apparatus comprising:

an axially elongated casing having a circular cross-sectional shape;

a rotor rotatably arranged in said casing about an axis of the casing, said rotor being a permanent magnet;

a first stator fixedly arranged in the casing and made of magnetic material, said stator having a connection portion and a pair of circumferentially spaced pole portions extending from the connection portion, each pole portion defining a pair of spaced side surfaces extending substantially radially and inner and outer circumferential surfaces connecting said side surfaces, said outer circumferential surface forming, in cross section, an arc shape corresponding to the inner periphery of the casing, allowing the outer circumferential surface to be located closely adjacent to the inner surface of the circular cross-sectional shape casing;

said rotor having a pair of radially spaced and oppositely magnetized pole portions, each of which defines a pair of spaced side surfaces extending substantially radially outward of the inner surfaces of the pole portions of the stator, allowing rotation of the rotor to a limited angle between a position where at least one pair of opposing side surfaces of the stator pole portions and the rotor pole portions are engaged with each other and another position where at least another one pair of the opposing surfaces of the stator pole portions and the rotor pole portions are engaged with each other;

coil means, arranged on one side of the rotor along the axis of the casing, for magnetizing said first stator so that the pole portions of the stator are oppositely magnetized, whereby a closed loop of magnetic flux, the direction of which is determined in accordance with the direction of an electric current in the coil means, is generated in order to attain the rotational movement of the rotor in a desired direction between said positions.

2. A rotary drive apparatus according to claim 1, further comprising thin layers made of a non-magnetic material arranged between said pairs of opposing side surface of the stator pole portions and the rotor pole portions.

3. A rotary drive apparatus according to claim 2, wherein said layers are fixedly connected to the corresponding side surfaces of the stator pole portions.

4. A rotary drive apparatus according to claim 1, further comprising a second stator made as a magnetic material fixedly arranged in the casing, said second stator having a pair of circumferentially spaced pole portions located between the pole portions of the first stator, said pole portions of the second stator defining inner surfaces located radially outward of the rotor so as to permit the rotor to rotate between the positions, and second coil means for magnetizing the second stator so that its pole portions are oppositely magnetized, whereby the rotor can have, in addition to said positions, another intermediate position located between said two positions, at which intermediate position the rotor pole portions are respectively located so that they align with the corresponding pole portions of the second stator.

5. A rotary drive apparatus according to claim 1, wherein said pole portions of the stator having the outer circumferential surface having an arc shaped cross-section are integral with respect to the connection portion which is coaxially arranged with respect to the axis of the casing, the coil means being arranged around said connection portion.

6. The rotary drive apparatus according to claim 1, wherein said rotor is adapted for integral connection to a rotary valve which is coaxial with respect to the axis of the rotor for opening a flow passageway when the rotor is in said first position and for closing the flow passageway when the rotor is in said second position.

7. A rotary drive apparatus comprising:

an axially elongated casing;

a rotor rotatably arranged in the casing about an axis of the casing and made from a permanent magnet;

a first stator fixedly arranged in the casing, said stator having a pair of circumferentially spaced pole portions, each of which defines a pair of spaced side surfaces extending substantially radially and an inner circumferential surface connecting said side surfaces;

said rotor having a pair of radially spaced pole portions, each of which defines a pair of spaced side surfaces extending substantially radially outward of the inner surfaces of the pole portions of the stator, allowing rotation of the rotor of a limited angle between a position where at least one pair of opposing side surfaces of the stator pole portions and the rotor pole portions are engaged with each other and another position where at least another one pair of the opposing surfaces of the stator pole portions and the rotor pole portions are engaged with each other;

one of the rotor or the stator being made as a permanent magnet, corresponding pole portions of said one member being oppositely magnetized;

the other one of the rotor and the stator being made of magnetic material;

coil means for magnetizing said other member so that the corresponding pole portions are oppositely magnetized, whereby a closed loop of magnetic flux, the direction of which is determined in accordance with the direction of an electric current in the coil means, is generated in order to attain the rotational movement of the rotor of desired direction between said positions; and a second stator made as a magnetic material fixedly arranged in the casing, said second stator having a pair of circumferentially spaced pole portions located between the pole portions of the first stator, said pole portions of the second stator defining inner surfaces located radially outward of the rotor so as to permit the rotor to rotate between the positions, and second coil means for magnetizing the second stator so that its pole portions are oppositely magnetized, whereby the rotor can have, in addition to said positions, another intermediate position located between said two positions, at which intermediate position the rotor pole portions are respectively located so that they align with the corresponding pole portions of the second stator.

8. A rotary drive apparatus according to claim 7, further comprising thin layers made of a non-magnetic material arranged between said pairs of opposing side surface of the stator pole portions and the rotor pole portions.

9. A rotary drive apparatus according to claim 8, wherein said layers are fixedly connected to the corresponding side surfaces of the stator pole portions.

10. A rotary drive apparatus according to claim 7, wherein said casing is substantially circularly cylindrical in form.

11. A rotary drive apparatus according to claim 10, wherein the axis of the circular cylindrical casing corresponds to the axis of rotation of the rotor.

* * * * *